(12) United States Patent
Zimron et al.

(10) Patent No.: US 7,340,897 B2
(45) Date of Patent: *Mar. 11, 2008

(54) METHOD OF AND APPARATUS FOR PRODUCING POWER FROM A HEAT SOURCE

(75) Inventors: Ohad Zimron, Gan Yavne (IL); Danny Batscha, Ramat Hasharon (IL)

(73) Assignee: Ormat Technologies, Inc., Sparks, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/261,473

(22) Filed: Oct. 31, 2005

(65) Prior Publication Data

US 2006/0048515 A1    Mar. 9, 2006

Related U.S. Application Data

(63) Continuation of application No. 09/902,802, filed on Jul. 12, 2001, now Pat. No. 6,960,839, which is a continuation-in-part of application No. 09/617,911, filed on Jul. 17, 2000, now abandoned, and a continuation-in-part of application No. 09/702,711, filed on Nov. 1, 2000, now abandoned.

(51) Int. Cl.
*F01K 27/00* (2006.01)
*F01K 25/08* (2006.01)

(52) U.S. Cl. ............... 60/641.1; 60/651; 60/671
(58) Field of Classification Search ........... 60/641.1, 60/649, 651, 671; 290/1 R, 2, 4 R
See application file for complete search history.

(56) References Cited

U.S. PATENT DOCUMENTS

| 4,104,535 A | 8/1978 | Bronicki |
|---|---|---|
| 4,132,075 A | 1/1979 | Fleck |
| 4,428,190 A * | 1/1984 | Bronicki ............ 60/655 |
| 5,038,567 A | 8/1991 | Mortiz |
| 5,437,157 A * | 8/1995 | Bronicki ............ 60/655 |
| 5,649,436 A | 7/1997 | Davidge |

(Continued)

OTHER PUBLICATIONS

The Dow Chemical Company, 1983 article "Achieving Low Pressure Cogeneration with DOWTHERM Heat Transfer Fluid".*

(Continued)

*Primary Examiner*—Hoang Nguyen
(74) *Attorney, Agent, or Firm*—The Nath Law Group; Gary M. Nath; Jerald L. Meyer

(57) ABSTRACT

A method for producing power from a heat source comprises the steps of: heating an intermediate fluid with heat from the heat source and producing a vaporized intermediate fluid in an intermediate fluid heater/vaporizer. Heat from the vaporized intermediate fluid vaporizes an organic liquid working fluid present in an organic working fluid vaporizer to form a vaporized organic working fluid and intermediate fluid condensate. The vaporized organic working fluid is expanded in an organic vapor turbine for generating power and producing expanded vaporized organic working fluid; the expanded organic vaporized working fluid being condensed to produce an organic fluid condensate with the organic fluid condensate being supplied to the organic fluid vaporizer. According to the present invention, prior to supplying the vaporized intermediate fluid to the organic fluid vaporizer the vaporized intermediate fluid is expanded in an intermediate fluid vapor turbine and power is produced.

8 Claims, 6 Drawing Sheets

U.S. PATENT DOCUMENTS

| | | | |
|---|---|---|---|
| 5,660,042 A | | 8/1997 | Bronicki |
| 5,664,414 A | * | 9/1997 | Bronicki et al. ......... 60/39.182 |
| 5,687,050 A | | 11/1997 | Bartsch |
| 5,687,570 A | | 11/1997 | Bronicki |
| 5,754,613 A | | 5/1998 | Hashiguchi |
| 5,799,490 A | | 9/1998 | Bronicki |
| 5,857,338 A | * | 1/1999 | Rigal ........................ 60/657 |
| 5,953,918 A | | 9/1999 | Kalina |
| 6,052,997 A | * | 4/2000 | Rosenblatt .................. 60/653 |
| 6,195,997 B1 | * | 3/2001 | Lewis et al. ................. 60/648 |
| 6,233,939 B1 | | 5/2001 | Ngo-Beelmann |
| 6,260,347 B1 | * | 7/2001 | Bronicki et al. ............. 60/774 |
| 6,571,548 B1 | * | 6/2003 | Bronicki et al. ............. 60/772 |
| 6,960,839 B2 | * | 11/2005 | Zimron et al. ................ 290/2 |

OTHER PUBLICATIONS

Ronald DiPippo "Geothermal Power Systems" Standard Handbook of Powerplant Engineering, 2nd Edition, Section 8.2, T. C. Elliot, K. Chen and R. C. Swanekamp, eds., pp. 8.27 - 8.60, McGraw-Hill INc., New York, 1998.

L. Bronicki, "Rankine Cycle Power Unit Operating with Isotope Heat Sources", Joint UKAEA-ENEA International Symposium A.E.R.E. Harwell, Paper Communication No. 38, Sep., 1996.

* cited by examiner

METHOD OF AND APPARATUS FOR PRODUCING POWER FROM A HEAT SOURCE

This application is a continuation application of Ser. No. 09/902,802, filed Jul. 12, 2001, now U.S. Pat. No. 6,960,839 which is a continuation-in-part application of Ser. No. 09/617,911, filed Jul. 17, 2000, now abandoned and Ser. No. 09/702,711, filed Nov. 1, 2000, now abandoned, the entire contents of which are hereby incorporated.

TECHNICAL FIELD

This invention relates to producing power, and more particularly, to a method of and apparatus for producing power using an intermediate fluid.

BACKGROUND OF THE INVENTION

Recently, the production of power and/or electricity and/or heat from heat sources e.g. waste heat from gas turbines, waste heat from other industrial processes, combustion of certain fuels, etc. has become more important. It is not always simple to produce power, and/or electricity from such sources. In addition, high efficiency levels are not always easy to attain when power is produced from these local heat sources. This is especially the case when water is not ready available or when freezing may occur and consequently vacuum in the power system needs to be minimized in order to avoid air entering into the system.

It is therefore an object of the present invention to provide a new and improved method of and apparatus for producing power wherein the disadvantages as outlined are reduced or substantially overcome.

SUMMARY OF THE INVENTION

A method for producing power from a heat source according to the present invention comprises the steps of: heating an intermediate fluid with heat from said heat source and producing a vaporized intermediate fluid in an intermediate fluid heater/vaporizer. Heat from the vaporized intermediate fluid is used to vaporize an organic, liquid working fluid in an organic fluid vaporizer to form a vaporized, organic, working fluid and intermediate fluid condensate. According to the present invention prior to supplying said vaporized intermediate fluid to said organic fluid vaporizer said vaporized intermediate fluid is expanded in an intermediate fluid vapor turbine and power is produced. The vaporized organic working fluid is expanded in an organic vapor turbine for generating power and producing expanded vaporized organic working fluid the expanded organic vaporized working fluid is condensed to produce an organic fluid condensate; and the organic fluid condensate is supplied to the organic fluid vaporizer. The intermediate fluid condensate produced is supplied to the intermediate fluid heater/vaporizer. The intermediate fluid can be water or other suitable fluid(s) and preferably, the intermediate fluid comprises an organic, alkylated heat transfer fluid. Most preferably, the intermediate fluid is a synthetic alkylated aromatic heat transfer fluid.

Furthermore, the present invention includes apparatus for producing power from a heat source comprising: an intermediate fluid heater/vaporizer that vaporizes the intermediate fluid with heat from said heat source and producing a vaporized intermediate fluid and an organic fluid vaporizer that vaporizes an organic liquid working fluid with heat from the vaporized intermediate fluid to form a vaporized organic working fluid and intermediate fluid condensate. According to the present invention, an organic vapor turbine expands the vaporized organic working fluid and generates power and produces expanded vaporized organic working fluid and an organic fluid condenser condenses said expanded organic vaporized working fluid to produce an organic fluid condensate. The organic fluid condensate is supplied to the organic fluid vaporizer. In accordance with the present invention, an intermediate fluid vapor turbine expands said vaporized intermediate fluid prior to supplying it to said organic fluid vaporizer such that the intermediate fluid vapor turbine produces power. A pump supplies the intermediate fluid condensate to the intermediate fluid heater/vaporizer. The intermediate fluid can be water or other suitable fluid(s) and preferably, the intermediate fluid comprises an organic, alkylated heat transfer fluid. Most preferably, the intermediate fluid is a synthetic alkylated aromatic heat transfer fluid.

BRIEF DESCRIPTION OF THE DRAWINGS

Embodiments of the present invention are described by way of example, and with reference to the accompanying drawings wherein.

Like reference numerals and designations in the various drawings refer to like elements.

DETAILED DESCRIPTION

Figure 1:
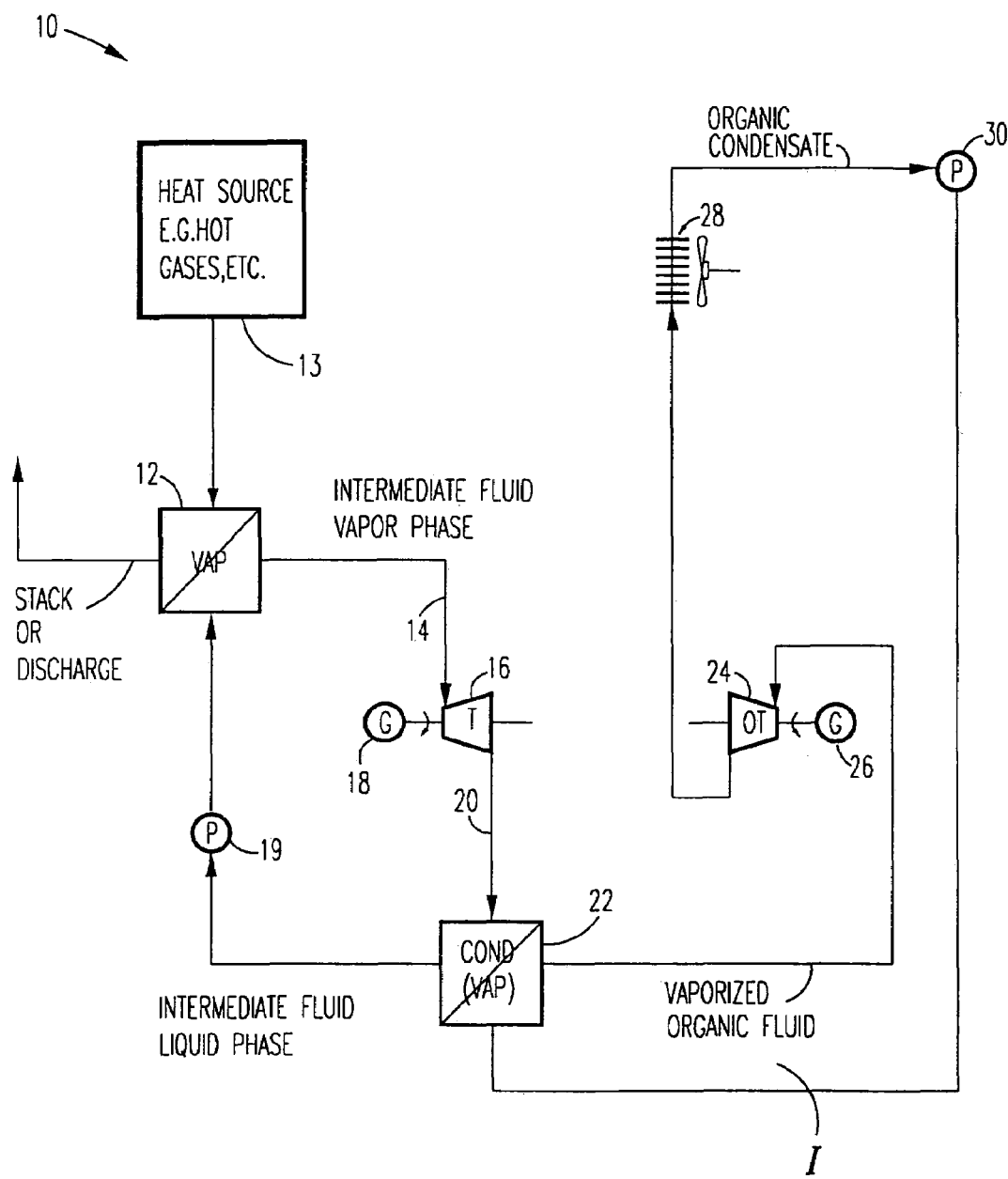
FIG. 1 is a schematic diagram of apparatus for producing a power in accordance with one embodiment of the present invention.

Referring now to FIG. 1, reference numeral 10 designates an embodiment of apparatus for producing power in accordance with the present invention. As can be seen from the drawing, the apparatus comprises intermediate fluid heater/vaporizer 12 through which vaporized intermediate fluid is produced using heat from heat source 13, e.g. using heat contained in hot gases, etc. The vaporized intermediate fluid is supplied to organic working fluid vaporizer 22 where it is condensed by transferring heat to organic fluid present in the vaporizer so that vaporized organic fluid is produced. Intermediate fluid condensate produced is returned to intermediate fluid heater/vaporizer 12 using pump 19. The vaporized organic fluid is supplied to organic vapor turbine 24 wherein it expands and produces power. Preferably, generator 26 is driven by organic vapor turbine 24 and produces electricity. Expanded vaporized organic fluid exiting organic vapor turbine 24 is supplied to organic fluid condenser 28 and organic fluid condensate is produced. Pump 30 supplies organic fluid condensate exiting organic fluid condenser 28 to organic working fluid vaporizer 22. In accordance with the present invention, prior to supplying vaporized intermediate fluid vaporizer 22, the vaporized intermediate fluid is supplied to intermediate fluid turbine 16 wherein the vaporized intermediate fluid expands and produces power. Also here, preferably, intermediate fluid turbine 16 drives generator 18 that produces electricity.

In operation, intermediate fluid present in intermediate fluid vaporizer 12 extracts heat from heat source 13, e.g. hot gases and intermediate fluid vapor is produced. The intermediate fluid vapor is supplied preferably to intermediate fluid turbine 16 and expands therein producing power and expanded intermediate fluid vapor exits intermediate fluid turbine 16. Since preferably, generator 18 is coupled to intermediate fluid turbine 16 electricity is produced. Expanded intermediate fluid vapor exiting intermediate fluid turbine 16 is supplied via line or conduit 20 to organic working fluid vaporizer 22 organic working fluid present in organic working fluid vaporizer 22 cools the expanded intermediate fluid vapor and intermediate fluid condensate as well as vaporized organic working fluid is produced. Intermediate fluid condensate is supplied using pump 19 to intermediate fluid vaporizer 12. Vaporized organic working fluid is supplied to organic working fluid turbine 24 wherein it expands and power is produced. Expanded organic working fluid vapor exits organic working fluid turbine 24. Preferably, organic working fluid turbine 24 is coupled to a generator 26 and electricity is, produced. The expanded organic working fluid vapor is supplied to organic working fluid condenser 28 that is preferably air-cooled and organic working fluid condensate is produced. Pump 30 supplies organic working fluid condensate to organic working fluid vaporizer 22.

The intermediate fluid can be water or other suitable fluid(s) and preferably, the intermediate fluid comprises an organic, alkylated heat transfer fluid. Most preferably, the intermediate fluid is a synthetic alkylated aromatic heat transfer fluid. The preferred intermediate fluid is advantageous since their use avoids problems of freezing, operates without being at vacuum conditions and there is no need for treatment. Water usually needs treatment when used as an intermediate fluid. Preferably, the synthetic, alkylated, aromatic heat transfer fluid is useful in a relative high temperature range: vaporizing temperature between about 250° C. and about 315° C. At these temperatures, the pressure of the intermediate fluid is between about 495 kPA and 1560 kPA. The relatively low pressures mentioned above make this type of fluid particularly suitable for use in the present invention. Often, the condensing temperature of the intermediate fluid on the intermediate fluid side of organic working fluid vaporizer 22 will preferably be in the range of about 190° C. to about 140° C. but can be much lower if need be. Furthermore, the use of this type of intermediate fluid as a heat transfer medium for transferring heat from the heat source to the organic working fluid and as well as producing power form the intermediate fluid increases the efficiency of the power producing system on a whole. Preferably, the organic working fluid comprises pentane, either n-pentane or iso-pentane.

Furthermore, if preferred organic fluid power cycle I can include a pre-heater, superheater and recuperator. In addition, if preferred, generators 18 and 26 can be replaced by a single common generator driven by turbines 16 and 24 either using dual shaft ends in the single common generator or through a gear drive. Most preferred, the common generator is interposed between turbines 16 and 24.

Figure 2:
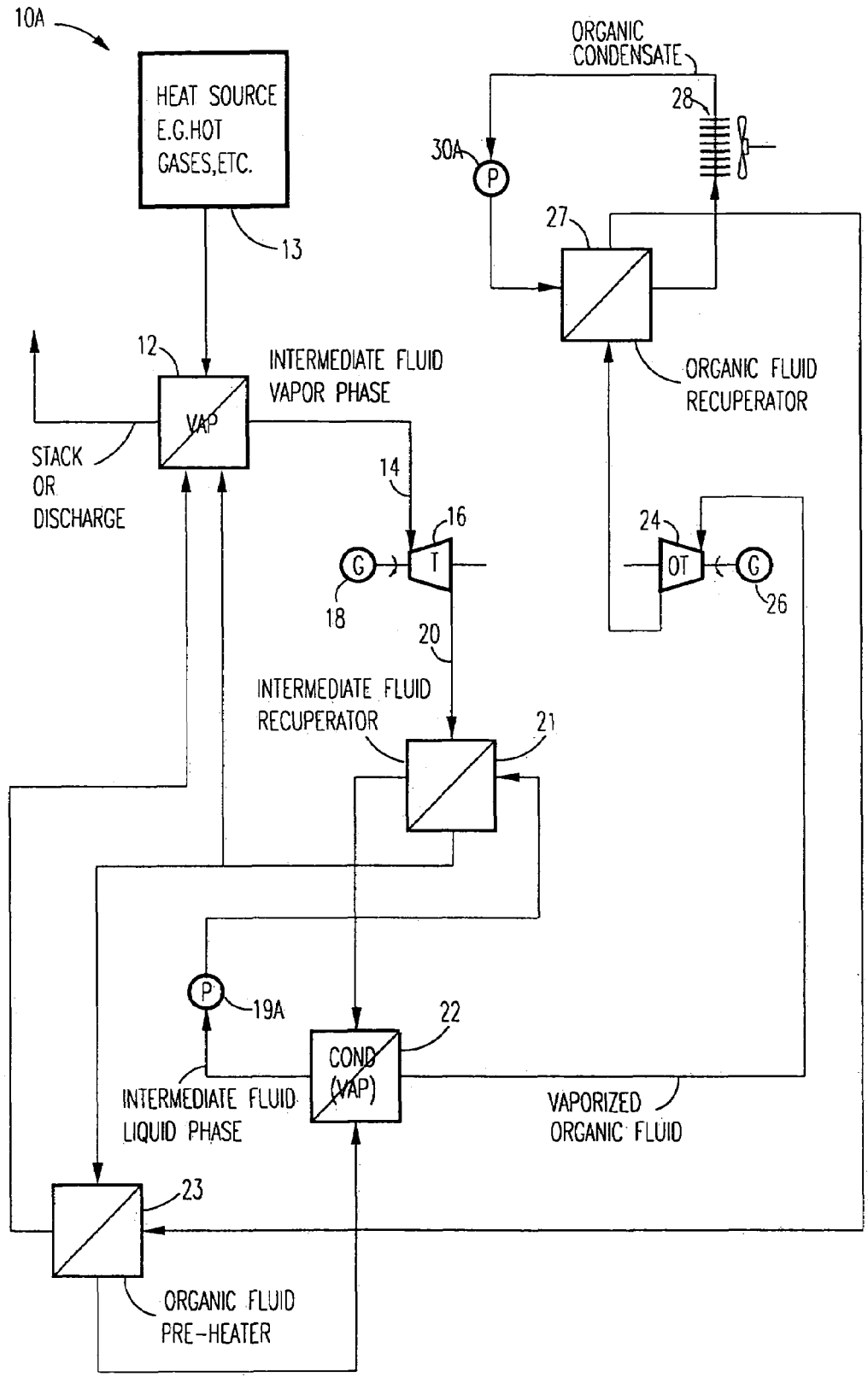
FIG. 2 is a schematic diagram of apparatus for producing power in accordance with another embodiment of the present invention.

Additionally, intermediate fluid condensate produced in organic working fluid vaporizer 22 can be used to pre-heat the organic working fluid prior to it entering the organic working fluid vaporizer. Moreover, if preferred, the intermediate fluid cycle can include a recuperator. An example of such a cycle is shown in FIG. 2 wherein numeral 10A designates another embodiment of the present invention and is presently considered the best mode for carrying out the present invention. As can be seen from the figure, numeral 21 designates an intermediate fluid recuperator in which heat is transferred from expanded intermediate fluid vapor exiting intermediate fluid turbine 16 to intermediate fluid condensate supplied by pump 19A from the intermediate fluid side of organic working fluid vaporizer 22. In this embodiment, portion of the heated intermediate fluid condensate exiting intermediate fluid recuperator 21 is supplied to organic fluid pre-heater 23 for pre-heating the organic working fluid prior to supplying it to organic working fluid vaporizer 22. A further portion of the heated intermediate fluid condensate exiting intermediate fluid recuperator 21 is supplied to intermediate fluid vaporizer 12. In addition, in this embodiment organic working fluid recuperator 27 is included and is used for transferring heat from expanded organic working fluid vapor exiting organic working fluid turbine 24 to organic working fluid condensate supplied by pump 30A from organic working fluid condenser 28. Heated organic working fluid condensate exiting organic working fluid recuperator 27 is supplied to organic working fluid pre-heater 23. Apart from these items previously mentioned with reference to the present embodiment described with relation to FIG. 2, this embodiment is similar to the embodiment described with relation to FIG. 1 and also operates in a similar manner.

Figure 3:
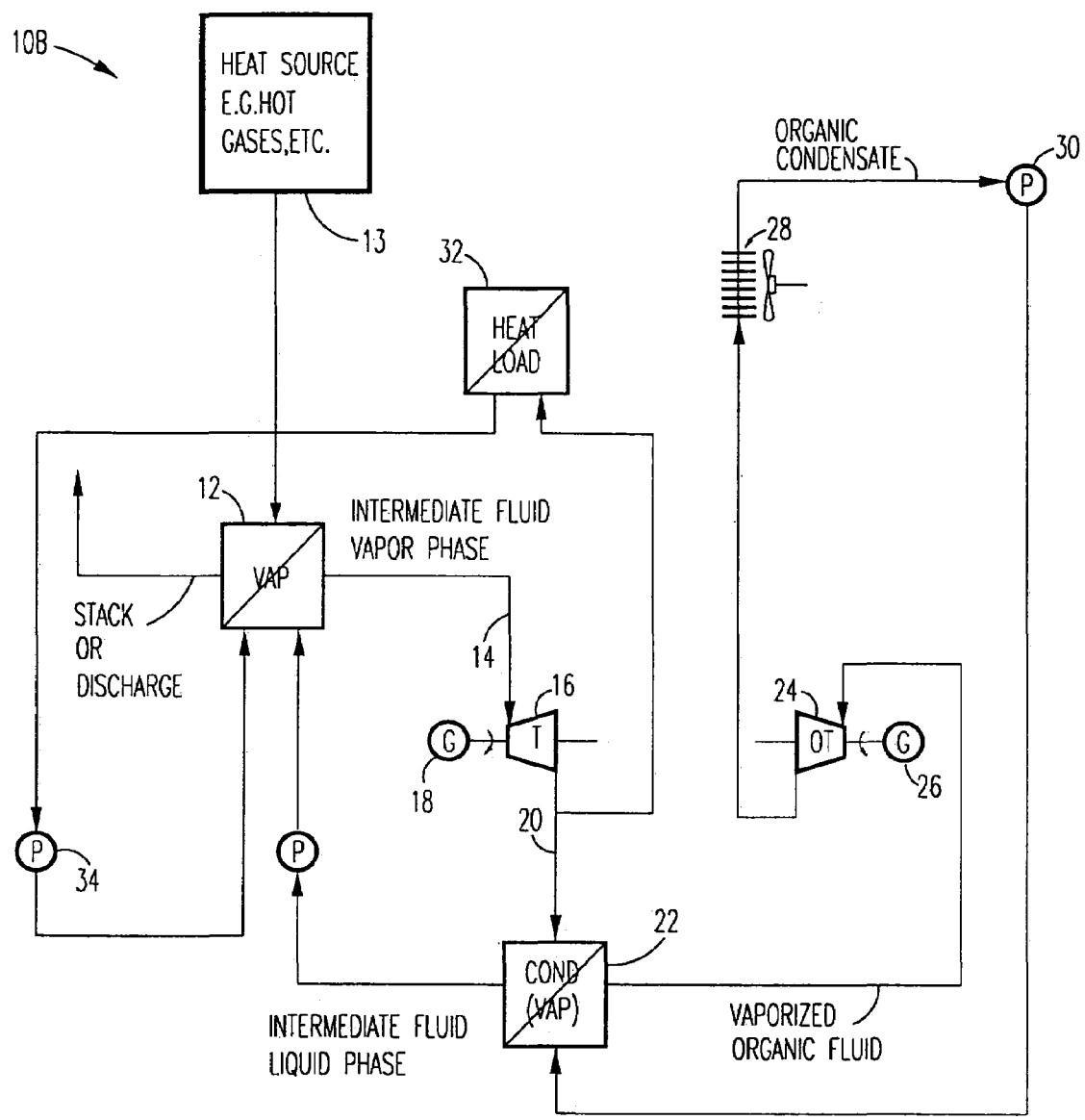
FIG. 3 is a schematic diagram of apparatus for producing power in accordance with a further embodiment of the present invention.

Referring now to FIG. 3, numeral 10B designates a further embodiment of the present invention. In this embodiment, if preferred, rather than supplying all of the intermediate fluid expanded vapor exiting intermediate fluid turbine 16 to organic working fluid vaporizer 22, only portion of the intermediate fluid expanded vapor can be supplied to organic working fluid vaporizer 22. The other portion of the intermediate fluid expanded vapor can be supplied to suitable heat load 32. Heat load 32 extracts the required heat from the other portion of intermediate fluid expanded vapor and preferably produces intermediate fluid condensate that is returned to intermediate fluid vaporizer 12 using pump 34.

Figure 4:
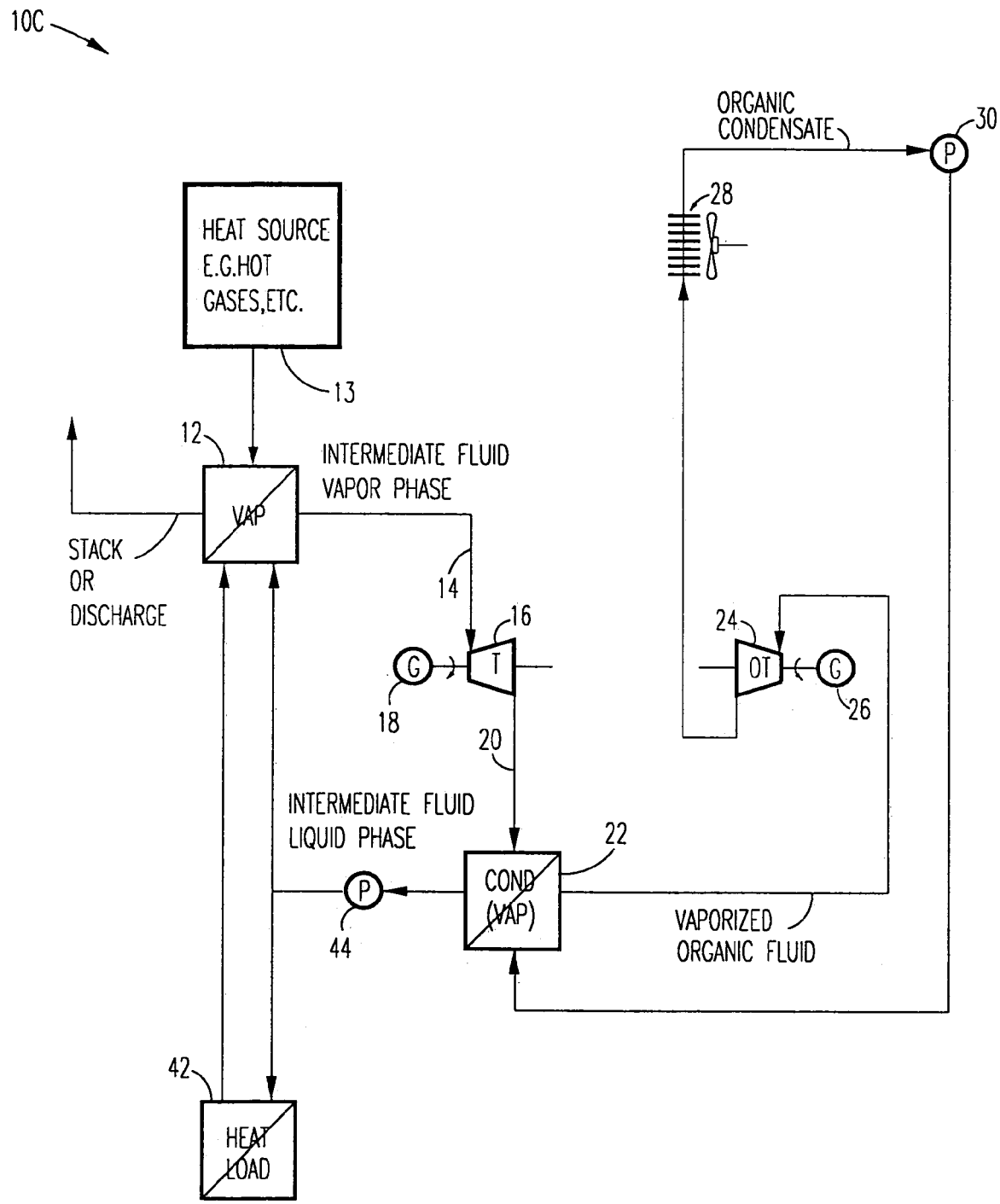
FIG. 4 is a schematic diagram of apparatus for producing power in accordance with an additional embodiment of the present invention.

Turning now to FIG. 4, numeral 10C designates an additional embodiment of the present invention. In this embodiment, if preferred, another heat load 42 can be supplied with heat from intermediate fluid condensate or portion thereof that exits organic working fluid vaporizer 22. The heat depleted intermediate fluid condensate exiting other heat load 42 is supplied, using pump 44, to intermediate fluid heater/vaporizer 12.

Figure 5:
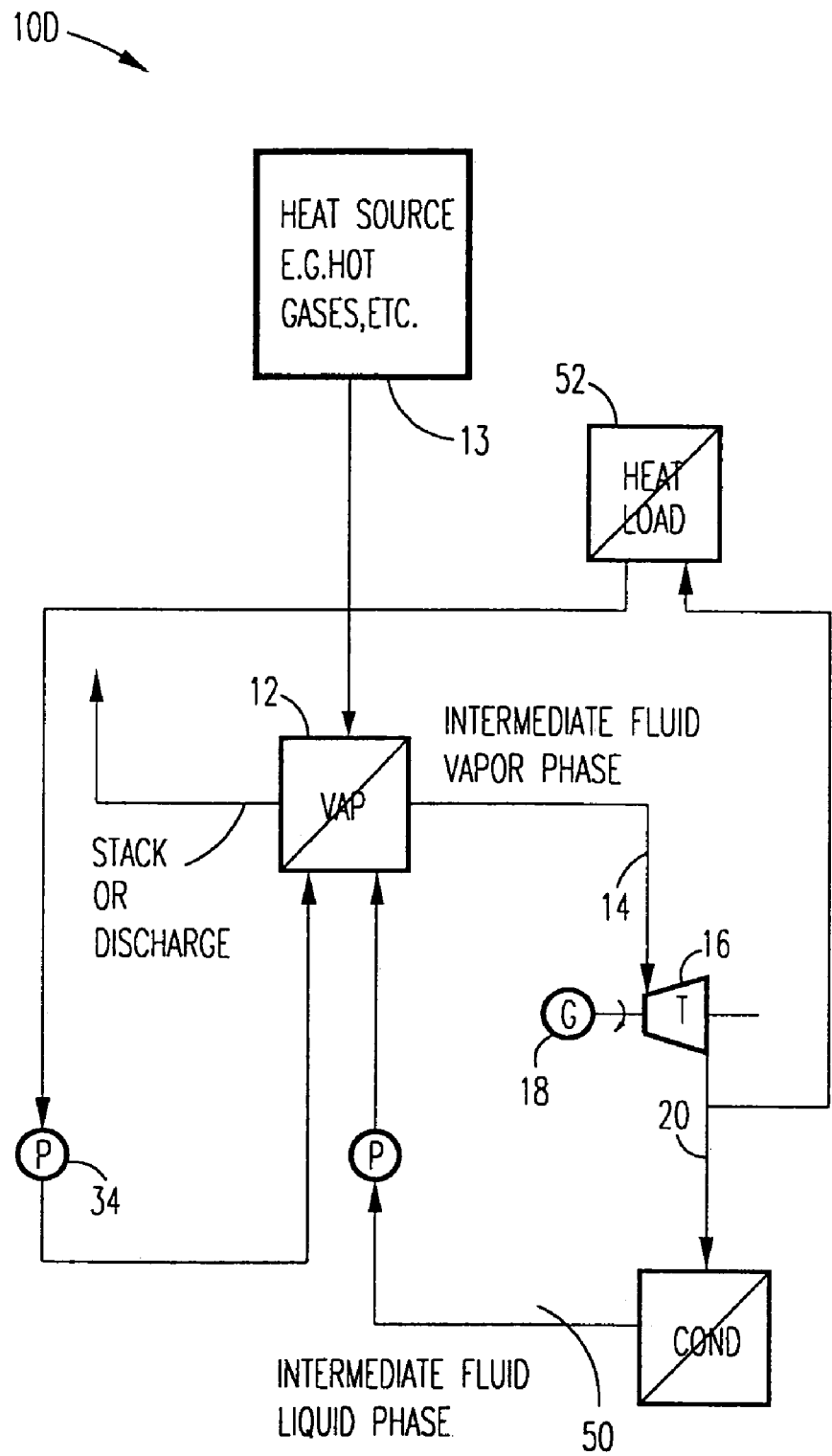
FIG. 5 is a schematic diagram of apparatus for producing power in accordance with a still further embodiment of the present invention.

In FIG. 5 numeral 10D designates a still further embodiment of the present invention. In this embodiment, the organic fluid power cycle is eliminated and merely intermediate power cycle 50 is used for producing power as well as supplying heat load 52.

Figure 6:
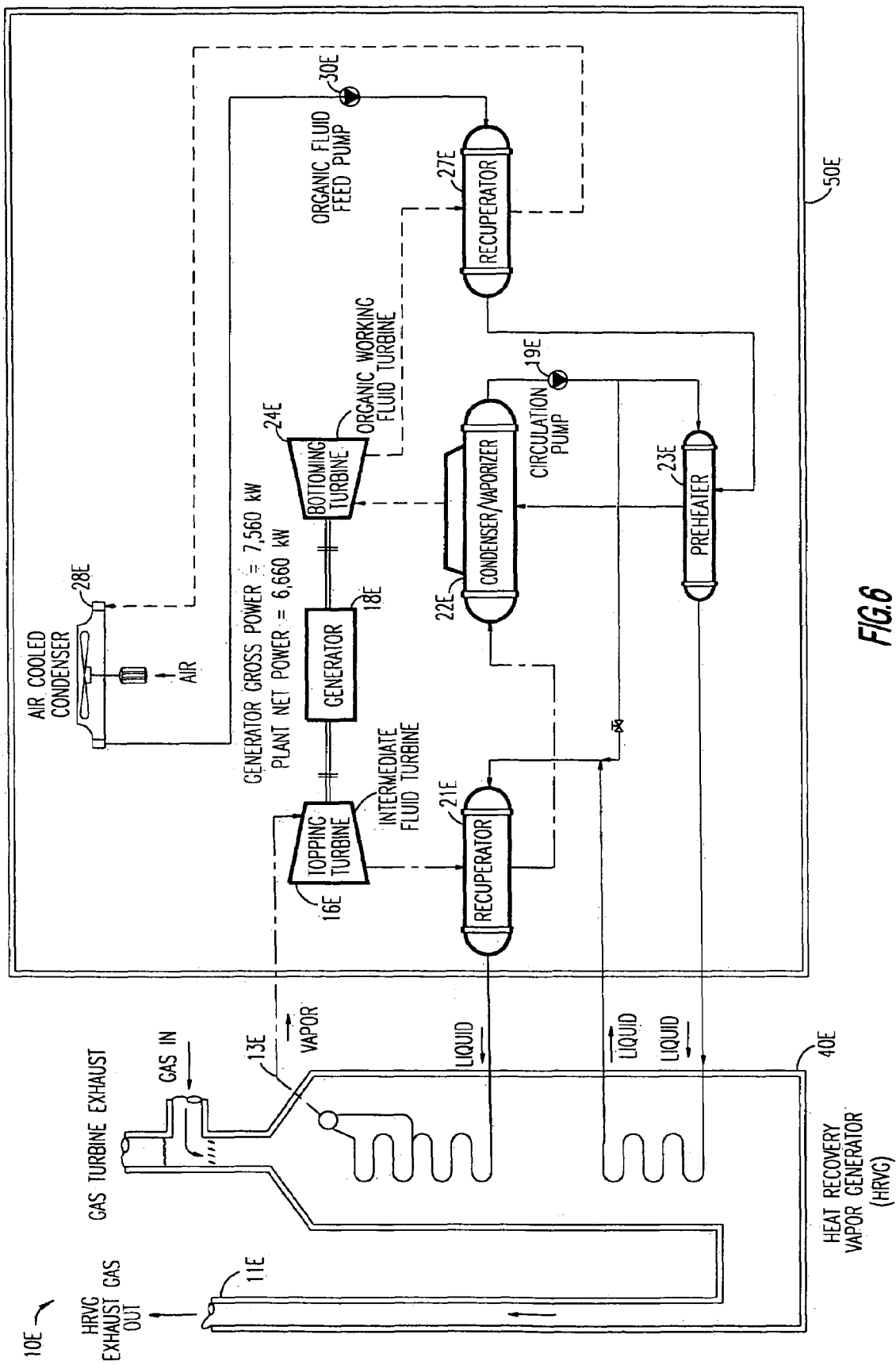
FIG. 6 is a schematic diagram of apparatus for producing power in accordance with an even further embodiment of the present invention. All the above-mentioned embodiments are, of course, interrelated.

Referring now to FIG. 6, numeral 10E refers to a still further embodiment of the present invention wherein a further example of a cycle including a recuperator in the intermediate fluid cycle is shown. As can be seen from the figure, numeral 21E designates an intermediate fluid recuperator in which heat is transferred from expanded intermediate fluid vapor exiting intermediate fluid turbine 16E to intermediate fluid condensate supplied by pump 19E from the intermediate fluid or shell side of organic working fluid vaporizer 22E. In this embodiment, portion of the intermediate fluid condensate exiting the intermediate fluid side of organic working fluid vaporizer 22E is supplied to organic fluid pre-heater 23E for pre-heating the organic working fluid prior to supplying it to organic working fluid vaporizer 22E. A further portion of the intermediate fluid condensate exiting the intermediate fluid side of organic working fluid vaporizer 22E is supplied to intermediate fluid recuperator 21E. In the present embodiment, heat from heat source 13E is added to the intermediate fluid condensate exiting organic pre-heater 23E. Consequently, the heat transferred from the intermediate fluid condensate to the organic working fluid in pre-heater 23E enables further heat to be extracted from heat source 13E. In addition, in this embodiment organic working fluid recuperator 27E is included and is used for transferring heat from expanded organic working fluid vapor exiting organic working fluid turbine 24E to organic working fluid condensate supplied by pump 30E from organic working fluid condenser 28E. Heated organic working fluid condensate exiting organic working fluid recuperator 27E is supplied to organic working fluid pre-heater 23E. Apart from these item previously mentioned with reference to the present embodiment described with relation to FIG. 6, this embodiment is similar to the embodiment described with relation to FIG. 1 and also operates in a similar manner.

In certain circumstances, all of the intermediate fluid exiting the intermediate fluid side of the organic working fluid vaporizer 22E can be supplied to organic working fluid pre-heater 23E. Thereafter, the cooled intermediate fluid exiting to organic working fluid pre-heater 23E can be supplied to heat source 13E, the heated intermediate fluid exiting heat source 13E being supplied to intermediate fluid recuperator 21E.

Preferably, the organic working fluid for this embodiment and all other embodiments mentioned herein comprises pentane, that is, iso-pentane and n-pentane.

In FIG. 6, generator 18E is preferably shared by the output of intermediate turbine 16E and organic working fluid turbine 24E. This is because intermediate turbine 16E can operate efficiently at relatively low rotational speeds (1500–1800 RPM), permitting it to be directly coupled to generator 18E whose rotation speed is also relatively low (1500–1800 RPM). Similarly the rotational speed of organic working fluid turbine 24E can also be relatively low (1500–1800 RPM), permitting it also to be directly coupled to generator 18E. Thus generator 18E is interposed between intermediate fluid turbine 16E and organic working fluid turbine 24E. However, if preferred, separate generators can be provided.

Furthermore, preferably, the embodiment described with reference to FIG. 6 comprises two separate entities, heat source unit or heat recovery vapor generator 40E and power cycle unit 50E.

Heat recovery vapor generator 40E is a once-through heater/vaporizer comprising the heater bundles and structure, exhaust gas duct-work, diverter valve and actuators, exhaust stack and by-pass stack. The purpose of the heat acquisition subsystem is to: a) direct and control/meter the gas turbines waste heat to the heat recovery vapor generator using a diverter valve; b) convert the heat contained in the combustion gases to vapor; and c) discard the cooled combustion gases to the atmosphere through a further exhaust stack 11E.

Heat recovery vapor generator 40E is a tube/pipe heat exchanger in which the intermediate fluid or thermal oil, flowing in the tubes, is heated and vaporized by the combustion gases flowing on the shell side. After being cooled, the combustion gases are discarded to the atmosphere through exhaust stack 11E. Heating and vaporizing occur in a once-through heater design. This intermediate fluid or thermal oil vapor leaves the heat recovery vapor generator 40E slightly wet. The wet vapor is directed to a separator wherein its moisture is removed by a gravity separator. Dry vapor, leaving the top of the separator, is directed to intermediate fluid or topping turbine 16E. The liquid intermediate fluid or thermal oil, leaving the bottom of the separator, is returned to the heat recovery vapor generator. The dry, separated intermediate fluid or thermal oil vapor directed to intermediate fluid turbine 16E is expanded to lower pressure. Intermediate fluid or topping turbine 16E, as well as organic working fluid or bottoming turbine 24E are both multi-staged (2 or 3 stages) axial, impulse-type turbines, preferably directly connected to opposite ends of generator 18E, as shown. Since the intermediate fluid or thermal oil is a hydrocarbon-based fluid (like pentane) the geometry and flow path of the intermediate fluid turbine 16E resembles that of organic working fluid turbine 24E.

As mentioned above, the intermediate fluid of the embodiment shown in FIG. 6 can be water or other suitable fluid(s) and preferably, the intermediate fluid comprises an organic, alkylated heat transfer fluid. Most preferably, intermediate fluid is a synthetic alkylated aromatic heat transfer fluid. While all fluids in these classes of fluids can be used as the intermediate fluid according to the present invention, the most preferred examples of the intermediate fluid at present are the thermal oils Therminol LT fluid and Dowtherm J. Therminol LT is the commercial name for the alkyl substituted aromatic fluid of the Solutia Company having a center in Belgium. Dowtherm J, on the other hand is the commercial name for a mixture of isomers of an alkylated aromatic fluid of the Dow Chemical Company being centered in the U.S.A. Fluids such as Therminol LT and Dowtherm J are stable to temperatures near 340° C. and as such are capable of better utilizing the high temperature portion of the gas turbine's waste heat more efficiently than pentane. Other most preferred examples of the intermediate fluids are isomers of diethyl benzene and mixtures of the isomers as well as butyl benzene.

It is pointed out that the intermediate fluid specified above can be used for all the embodiments mentioned herein.

Examples of heat sources from which the present invention can extract heat from are waste heat from gas turbines, waste heat from other industrial processes, waste heat produced in cement manufacture and in the cement manufacturing industry, heat produced by the combustion of biomass fuel, etc.

Furthermore, while this specification refers to the heat transfer cycle as using an intermediate fluid, it is possible to consider, in accordance with the present invention, the cycle using the intermediate fluid as a topping cycle with the organic working fluid cycle as a bottoming cycle.

Moreover, while the embodiments of the present invention describe the use of generators 18 or 26 or the use of a common generator for producing electricity, in accordance with the present invention, the power produced by turbines 16 and 24 or either of them can be used as a mechanical power. Thus, for example, they can run a compressor, other loads, etc.

While it is mentioned above that the preferred organic working fluid is pentane, that is, iso-pentane and n-pentane, other fluids such as butane and iso-butane, hexane and iso-hexane as well as additional fluids such as hydrocarbons, for example aliphatic parrafins in their normal and isomeric form, can be used as the working fluid for the above described invention and its embodiments. In addition, mixtures of the above mentioned fluids can also be used as the working fluid for the above described invention and its embodiments.

In addition, it should be noted that means mentioned in this specification refer to suitable means for carrying out the present invention.

Furthermore, it should be pointed out that the present invention includes as well the method for operating the apparatus disclosed with reference to above-described figures.

It is believed that the advantages and improved results furnished by the method and apparatus of the present invention are apparent from the foregoing description of the invention. Various changes and modifications may be made without departing from the spirit and scope of the invention as described in the claims that follow.

What is claimed is:

1. A method for producing power from a heat source comprising the steps of:
   (a) extracting heat from a heat source using an organic working fluid and producing organic working fluid vapor;
   (b) expanding said organic working fluid vapor in a vapor turbine for producing power and from which expanded organic working fluid is extracted;
   (c) transferring heat from said expanded organic working fluid to further organic working fluid condensate for producing superheated further organic working fluid;
   (d) expanding said superheated further organic working fluid vapor for producing power and expanded further organic working fluid vapor;
   (e) transferring heat from said expanded further organic working fluid to further organic working fluid condensate so that heat depleted expanded further organic working fluid is produced;
   (f) condensing said heat depleted expanded further organic working fluid and producing said further organic working fluid condensate; and
   (g) supplying said further organic working fluid condensate to a heat exchanger for receiving heat contained in said expanded further organic working fluid.

2. A method according to claim 1 including transferring heat from said expanded organic working fluid to further organic working fluid condensate for vaporizing said further organic working fluid.

3. A method according to claim 1 further including the step of transferring heat from said expanded organic working fluid to organic working fluid condensate for producing heated organic working fluid condensate and heat depleted expanded organic working fluid prior to transferring heat to said further organic fluid condensate.

4. A method according to claim 1 wherein said organic working fluid and said further organic working fluid are separated into two separate flow paths.

5. A method according to claim 1 wherein said method is carried out by using pentane or iso-pentane.

6. A method according to claim 1 wherein said method is carried out by using butane or iso-butane.

7. A method according claim 1 wherein said organic working fluid comprises a fluid selected from the group consisting of an alkyl substituted aromatic fluid and a mixture of isomers of an alkylated aromatic fluid.

8. A method according to claim 1 wherein said further organic working fluid comprises a fluid selected from the group consisting of butane, iso-butane, n-pentane, iso-pentane, hexane, iso-hexane and mixtures of thereof.

* * * * *